(12) United States Patent
Sohn et al.

(10) Patent No.: US 8,098,731 B2
(45) Date of Patent: Jan. 17, 2012

(54) INTRAPREDICTION METHOD AND APPARATUS USING VIDEO SYMMETRY AND VIDEO ENCODING AND DECODING METHOD AND APPARATUS

(75) Inventors: Yu-mi Sohn, Seongnam-si (KR);
Jeong-hoon Park, Seoul (KR);
Sang-rae Lee, Suwon-si (KR);
So-young Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1714 days.

(21) Appl. No.: 11/362,816

(22) Filed: Feb. 28, 2006

(65) Prior Publication Data
US 2006/0274956 A1    Dec. 7, 2006

(30) Foreign Application Priority Data
Jun. 3, 2005    (KR) .................. 10-2005-0048003

(51) Int. Cl.
*H04N 7/12* (2006.01)
(52) U.S. Cl. .................................. 375/240.16
(58) Field of Classification Search ............. 375/240.16, 375/240.13, 240.12, 240.01
See application file for complete search history.

(56) References Cited

U.S. PATENT DOCUMENTS

| 5,717,462 | A | 2/1998 | Hayashi |
| 6,571,016 | B1 | 5/2003 | Mehrotra et al. |
| 2003/0185452 | A1 | 10/2003 | Wang et al. |
| 2003/0231795 | A1 | 12/2003 | Karczewicz |
| 2005/0135679 | A1* | 6/2005 | Yoon et al. ........... 382/190 |
| 2006/0188165 | A1* | 8/2006 | Karczewicz .......... 382/238 |

FOREIGN PATENT DOCUMENTS

| KR | 10-2000-0057175 A | 9/2000 |
| KR | 10-2005-0007607 A | 1/2005 |
| KR | 10-2005-0019809 A | 3/2005 |

OTHER PUBLICATIONS

Cicconi et al., "A Symmetry-Oriented Approach to Intraframe Image Coding," Digital Signal Processing, Jan. 1, 1994, pp. 63-73, vol. 4, No. 1, Academic Press, Orlando, FL, USA.
Cicconi et al., "Efficient Region-Based Motion Estimation and Symmetry Oriented Segmentation for Image Sequence Coding," IEEE Transactions on Circuits and Systems for Video Technology, Jun. 1, 1994, pp. 357-364, vol. 4, No. 3, IEEE Service Center, Piscataway, NJ, USA.
Csillag et al., "Iterative Motion-based Segmentation for Object-based Video Coding," International Conference on Image Processing, Oct. 1997, pp. 73-76, vol. 1, IEEE Comput. Society, Los Alamitos, CA, USA.
Extended European Search Report issued Sep. 7, 2011 in corresponding European Patent Application No. 06251279.3.

* cited by examiner

*Primary Examiner* — Khai Tran
(74) *Attorney, Agent, or Firm* — Sughrue Mion, PLLC

(57) ABSTRACT

An intraprediction method which improves compression efficiency using the symmetry of a video in the intraprediction of the video and a video encoding and decoding method and apparatus using the intraprediction method. The intraprediction method includes performing intraprediction by predicting a first region to be encoded in a video based on axial symmetry of a second region of the video with respect to a predetermined axis.

31 Claims, 11 Drawing Sheets

INTRAPREDICTION METHOD AND APPARATUS USING VIDEO SYMMETRY AND VIDEO ENCODING AND DECODING METHOD AND APPARATUS

CROSS-REFERENCE TO RELATED PATENT APPLICATION

This application claims priority from Korean Patent Application No. 10-2005-0048003, filed on Jun. 3, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to the intraprediction of a video, and more particularly, to intraprediction which improves compression efficiency using the symmetry of a video in the intraprediction of the video and video encoding and decoding using the intraprediction method.

2. Description of the Related Art

In well-known video compression standards such as MPEG-1, MPEG-2, MPEG-4 Visual, H.261, H.263, and H.264, a picture is generally divided into macroblocks for video encoding. After each of the macroblocks is encoded in all encoding modes available in interprediction and intraprediction, bit rates required for encoding of the macroblock and rate-distortion (RD) costs between the original macroblock and a decoded macroblock in encoding modes are compared. Then an appropriate encoding mode is selected according to the result of the comparison and the macroblock is encoded in the selected encoding mode.

In intraprediction, a prediction value of a macroblock to be encoded is predicted using a pixel value of a pixel that is spatially adjacent to the macroblock to be encoded and a difference between the prediction value and the original pixel value is encoded, instead of referring to reference pictures, in order to encode macroblocks of a current picture.

Figures 1, 2:
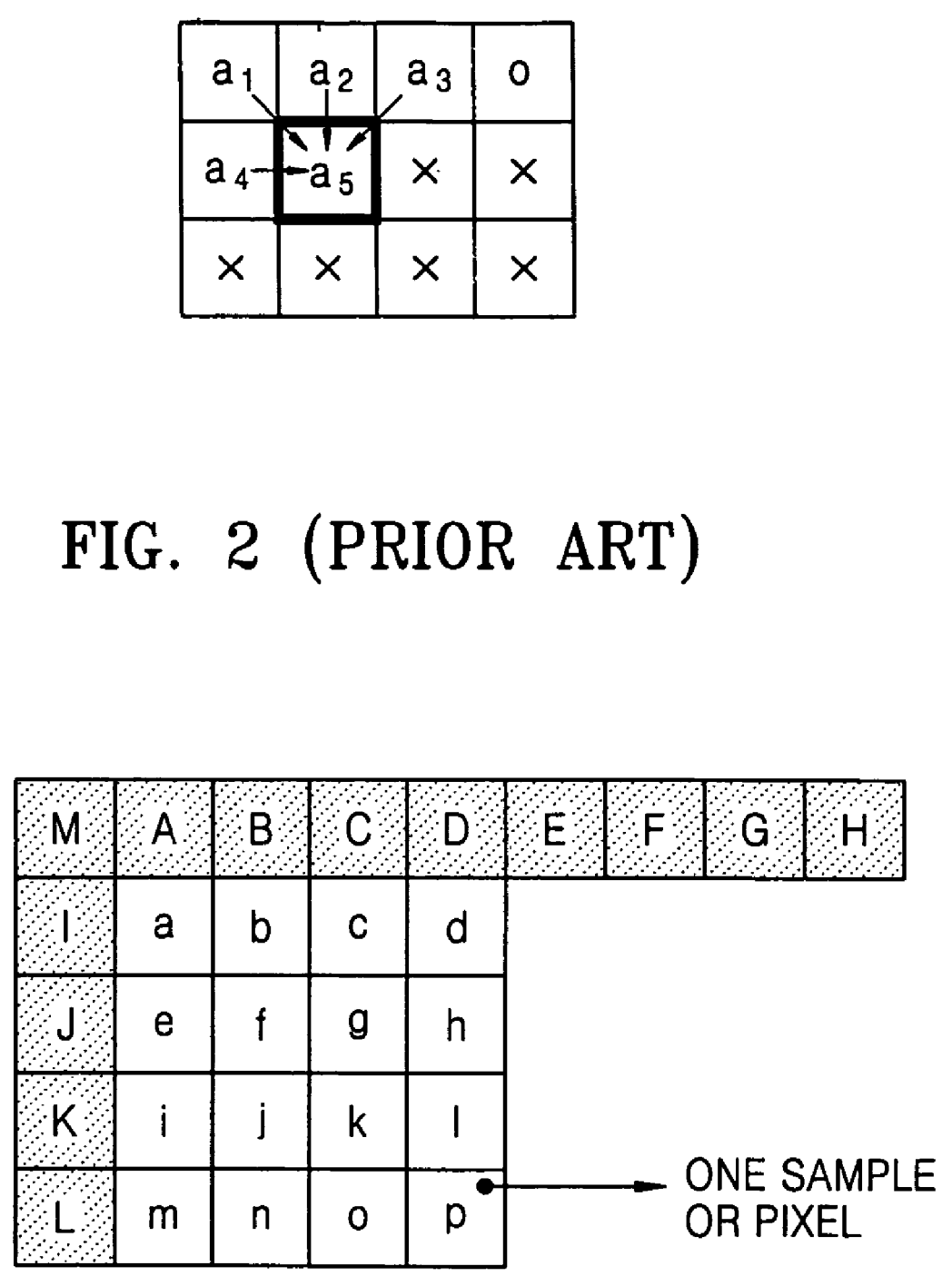

FIG. 1 illustrates previous macroblocks used for the intraprediction of a current macroblock $a_5$ according to prior art.

Referring to FIG. 1, previous macroblocks $a_1$, $a_2$, $a_3$, and $a_4$ are used for the intraprediction of a current macroblock $a_5$. According to a raster scan scheme, macroblocks included in a picture are scanned left-to-right and top-to-bottom. Thus, the previous macroblocks $a_1$, $a_2$, $a_3$, and $a_4$ are already scanned and encoded before the current macroblock $a_5$. Because macroblocks marked with X are not encoded, they cannot be used for predictive encoding of the current macroblock $a_5$. Because macroblocks marked with O have low correlation with the current macroblock $a_5$, they are not used for predictive encoding of the current macroblock $a_5$. After being discrete cosine transformed and quantized, the previous macroblocks $a_1$, $a_2$, $a_3$, and $a_4$ are inversely quantized and inversely discrete cosine transformed and are then reconstructed.

FIG. 2 is a reference diagram for explaining adjacent pixels used in intra 4×4 modes of H.264 according to prior art.

Referring to FIG. 2, lower-case letters a through p indicate pixels of a 4×4 block to be predicted, and upper-case letters A through M located above and on the left side of the 4×4 block indicate adjacent samples or pixels required for intraprediction of the 4×4 block, which have been already encoded and reconstructed.

FIG. 3 illustrates intra 4×4 modes used in H.264 according to prior art.

Referring to FIG. 3, the intra 4×4 modes include a total of 9 modes, i.e., a direct current (DC) mode, a vertical mode, a horizontal mode, a diagonal down-left mode, a diagonal down-right mode, a vertical left mode, a vertical right mode, a horizontal up mode, and a horizontal down mode. In the intra 4×4 modes, pixel values of pixels a through p are predicted from pixels A through M of adjacent macroblocks. As illustrated in FIG. 3, in the intra 4×4 modes, adjacent pixels in a frame including a block to be intrapredicted are used as reference pixels. As such, in an intraprediction method according to prior art, a prediction value of a macroblock to be encoded is calculated using pixel values of pixels that are spatially adjacent to the macroblock to be encoded. In many cases, objects included in a video are symmetric with respect to a predetermined axis. However, in an intraprediction method according to prior art, prediction is performed by merely using adjacent pixels without efficiently using such symmetry.

SUMMARY OF THE INVENTION

The present invention provides an intraprediction method which improves compression efficiency using the symmetry of a video and video encoding and decoding method and apparatus using the intraprediction method.

According to one aspect of the present invention, there is provided an intraprediction method. The intraprediction method includes performing intraprediction by predicting a first region to be encoded in a video based on axial symmetry of a second region of the video with respect to a predetermined axis.

According to another aspect of the present invention, there is provided an intraprediction apparatus which performs intraprediction by predicting a first region to be encoded in a video based on axial symmetry of a second region of the video with respect to a predetermined axis.

According to still another aspect of the present invention, there is provided a video encoding method. The video encoding method includes detecting a symmetric region of a video to be encoded in an intraprediction mode, determining a symmetry axis of the detected symmetric region and predicting a first portion of the detected symmetric region based on a second portion of the detected symmetric region with respect to the determined symmetry axis, and calculating a difference between the first portion and the second portion and performing compression encoding on information about the difference and information about the detected symmetric region.

According to yet another aspect of the present invention, there is provided a video encoder including an intraprediction unit and a compression unit. The intraprediction unit detects a symmetric region of a video and predicting a first portion of the detected symmetric region from a second portion of the detected symmetric region with respect to a symmetry axis. The compression unit performs compression encoding on information about a difference between a video predicted by the intraprediction unit and the original video and information about the detected symmetric region.

According to yet another aspect of the present invention, there is provided a video decoding method of decoding a video from a compression-encoded bitstream. The video decoding method includes detecting a symmetric region from a video included in the compression-encoded bitstream and decoding a first portion of the detected symmetric region and then a second portion of the detected symmetric region with respect to a symmetry axis of the detected symmetric region and predicting the second portion using the decoded first portion.

According to yet another aspect of the present invention, there is provided a video decoder that decodes a video from a compression-encoded bitstream. The video decoder includes an intraprediction unit that detects a symmetric region from a video included in the compression-encoded bitstream, decodes a first portion of the detected symmetric region and then a second portion of the detected symmetric region with respect to a symmetry axis of the detected symmetric region, and predicts the second portion using the decoded first portion.

BRIEF DESCRIPTION OF THE DRAWINGS

The above and other aspects of the present invention will become more apparent by describing in detail exemplary embodiments thereof with reference to the attached drawings in which:

FIG. 1 illustrates previous macroblocks used for the intraprediction of a current macroblock according to prior art;

FIG. 2 is a reference diagram for explaining adjacent pixels used in intra 4×4 modes of H.264 according to prior art;

DETAILED DESCRIPTION OF EXEMPLARY EMBODIMENTS THE INVENTION

Figure 4:
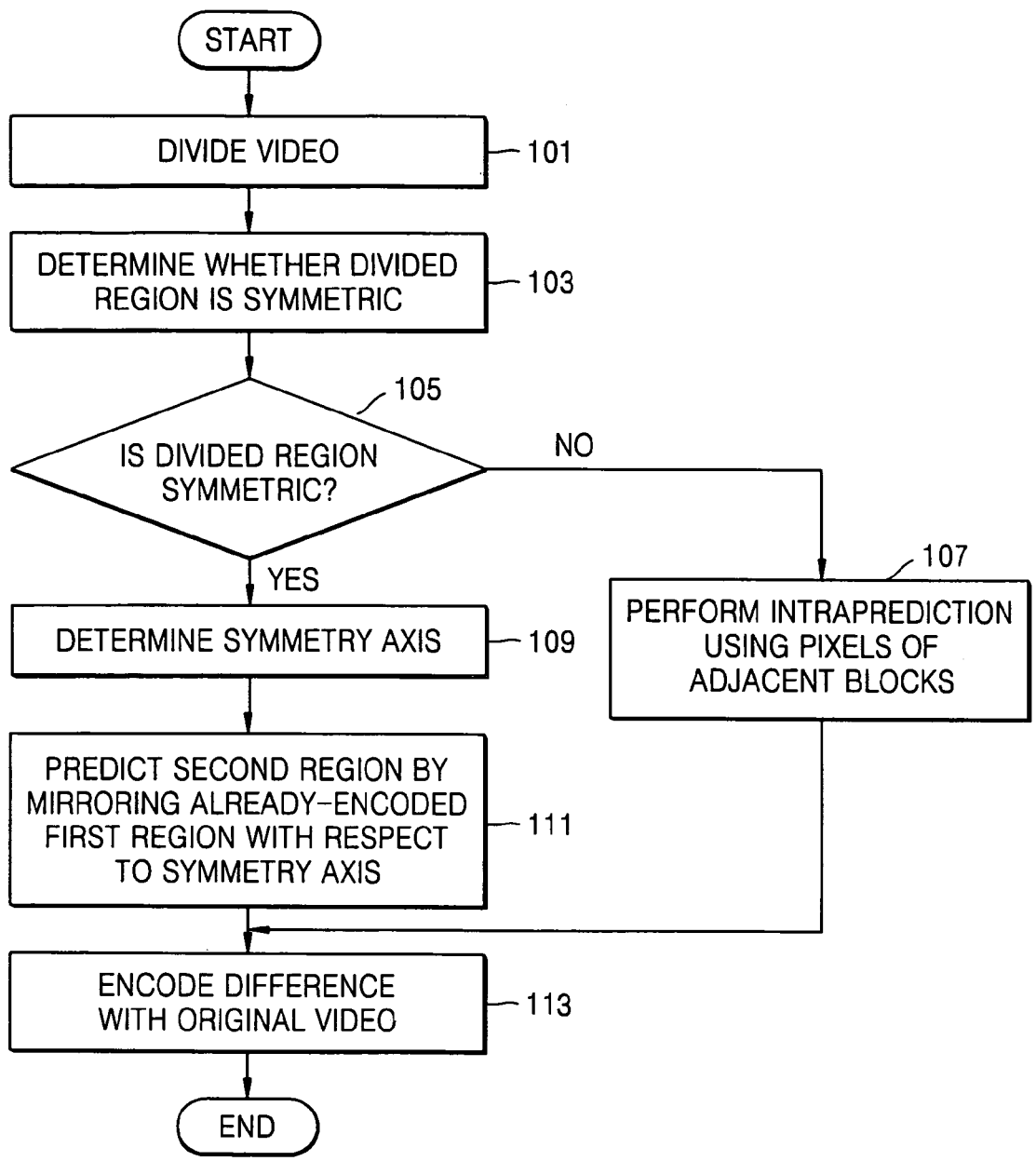
FIG. 4 is a flowchart illustrating an intraprediction method using the symmetry of a video according to an exemplary embodiment of the present invention.
Figure 5:
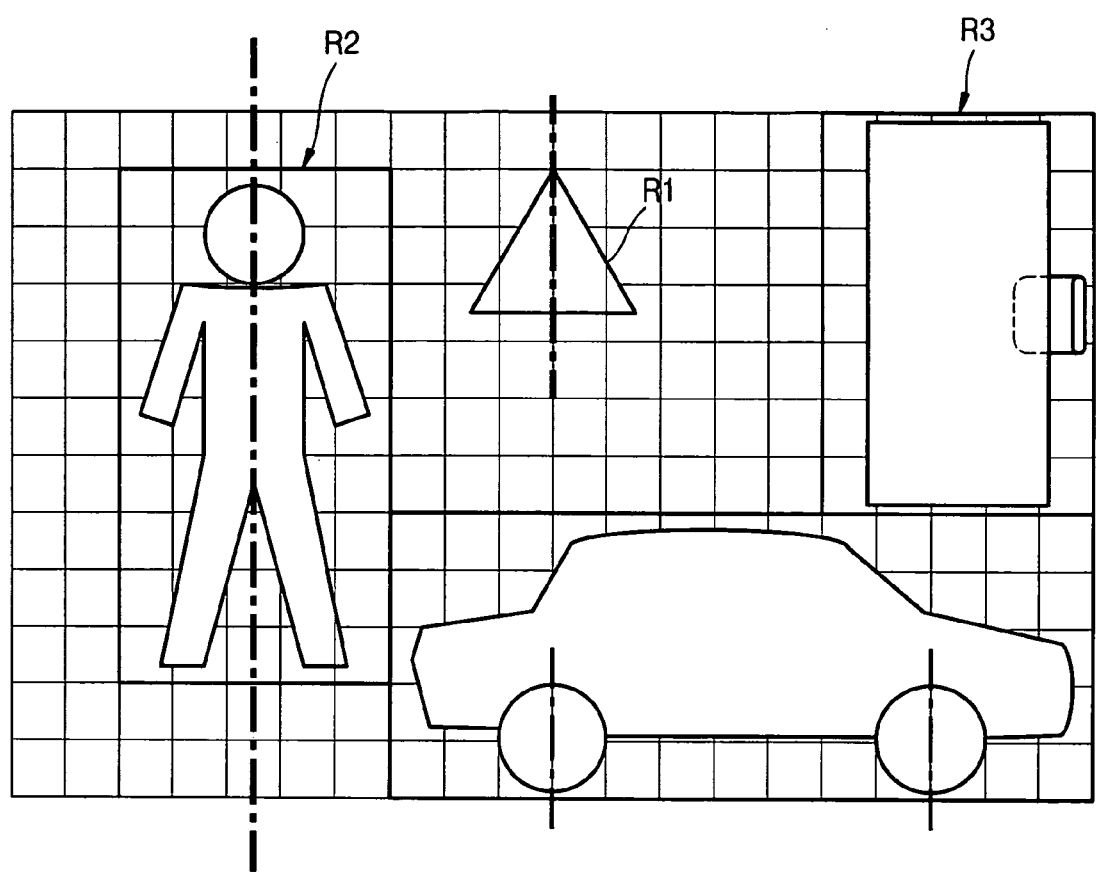
FIG. 5 illustrates an example of an input video encoded by an intraprediction method using the symmetry of a video according to an exemplary embodiment of the present invention.

FIG. 4 is a flowchart illustrating an intraprediction method using the symmetry of a video according to an exemplary embodiment of the present invention, and FIG. 5 illustrates an example of an input video encoded by an intraprediction method using the symmetry of a video according to an exemplary embodiment of the present invention.

In the intraprediction method according to an exemplary embodiment of the present invention, a region to be encoded in a video is predicted using the axial symmetry of another region of the video.

In particular, in the intraprediction method according to the present invention, a symmetric region is detected from a video and a portion of the symmetric region is mirrored with respect to a symmetry axis to remove spatial redundancy, thereby improving compression efficiency. The mirroring is used for predicting a portion of a symmetric region using the axial symmetry of an already-encoded portion of the symmetric region with respect to the symmetry axis. In a conventional intraprediction method, in a symmetric region, a pixel value of a current block is predicted by merely using pixel values of adjacent blocks without a separate process for the symmetric region. However, in the intraprediction method according to the current exemplary embodiment of the present invention, a portion of a symmetric region is predicted based on the other portion of the symmetric region using the spatial similarity of the symmetric region, thereby reducing a difference between the original video and an intrapredicted video and thus improving compression efficiency.

Referring to FIG. 4, an input video is divided in operation 101. Video division involves efficiently separating a meaningful object or regions having the same color in a video from a background or other objects, like human cognition. Various well-known methods can be used for the video division. For example, a video may be divided by detecting an object in the video through contour detection and motion vector tracking. The contour detection includes simplifying an input video by removing a detailed signal other than information required for the video division from the input video, detecting a region having uniform brightness from the simplified video, and determining a boundary between regions based on information about the simplified video and the uniform-brightness region. The motion vector tracking method includes setting a motion model and dividing an input video into regions having identical motions based on a motion model. The motion model is expressed as a multi-dimensional parameter using spatial coordinates. For the video division, motion estimation is performed. Since the motion estimation can be made based on information about regions, the motion compensation and the video division are performed through interaction with each other.

After the video division is completed, it is determined whether each of the divided regions is symmetric in operation 103. For the determination, a divided region having a symmetric contour may be determined to be a symmetric region. Alternatively, for the determination, a divided region is divided into portions by a line that passes through the divided region and a difference between the divided portions is obtained.

Figure 6:
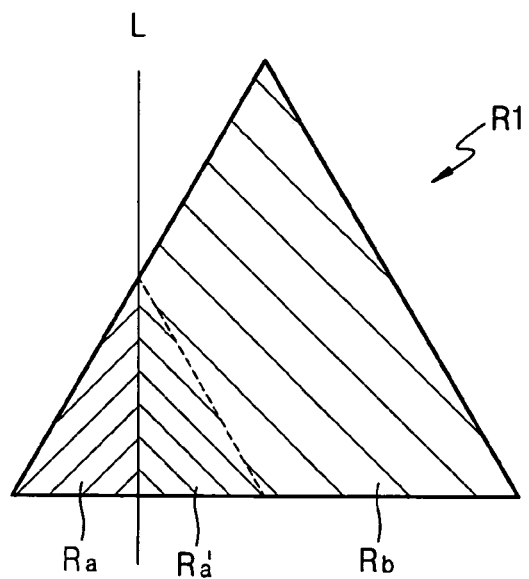
FIG. 6 is a view for explaining a process of determining whether a divided region R1 illustrated in FIG. 5 is symmetric.

FIG. 6 is a view for explaining a process of determining whether a divided region R1 illustrated in FIG. 5 is symmetric.

Referring to FIG. 6, a divided region R1 taking the shape of a regular triangle is symmetric with respect to a line passing through a vertex and the midpoint of a base line of the divided region R1. A human can easily recognize the symmetry through visual perception, but a video processing system requires a process of determining whether a divided region is symmetric. To this end, the divided region R1 is first divided into two portions Ra and Rb by a line L passing through the divided region R1. Next, a difference between the two divided portions Ra and Rb is obtained and the divided region R1 is determined to be symmetric if the difference is less than a predetermined reference value. If the difference is greater than the predetermined reference value, the process is repeated while the position of the line L is changed and the divided region R1 is finally determined to be asymmetric if the difference is greater than the predetermined reference value with respect to any line.

Here, to obtain the difference between the two divided portions Ra and Rb, a flipped region Ra' is formed through the axial symmetry of one of the two divided portions Ra and Rb, e.g., the divided portion Ra, with respect to the line L and a difference between pixel values of the flipped region Ra' and the other portion Rb is calculated, and the divided region R1 is determined to be symmetric if the difference is less than a predetermined reference value.

After it is determined whether a divided region is asymmetric by using the above-described process in operation 105, the divided region is intrapredicted using pixels of adjacent blocks like in a conventional intraprediction method in operation 107 if the divided region is determined to be asymmetric.

If the divided. region is determined to be symmetric, the symmetry axis of the divided region is determined in operation 109. Here, the symmetry axis means a straight line that minimizes a difference between regions divided by the straight line among straight lines passing through a symmetric region. The symmetry axis may be a line determined using the process of determining whether a divided region is symmetric. Next, in operation 111, the symmetric region is divided into a first region and a second region by the determined symmetry axis and a prediction value of the second region is calculated by mirroring the first region encoded prior to the second region with respect to the determined symmetry axis. According to a general block processing order in which a block is processed left-to-right and top-to-bottom, in a vertically symmetric region, an upper region corresponds to the first region and a lower region corresponds to the second region. Similarly, in a horizontally symmetric region, a left-side region corresponds to the first region and a right-side region corresponds to the second region.

More specifically, the first region is divided into macroblocks that are units of encoding and the macroblocks are encoded according to a conventional method. The first region is decoded for reconstruction and pixel values of the second region are predicted using the axial symmetry of pixels of the first region.

Figure 7:
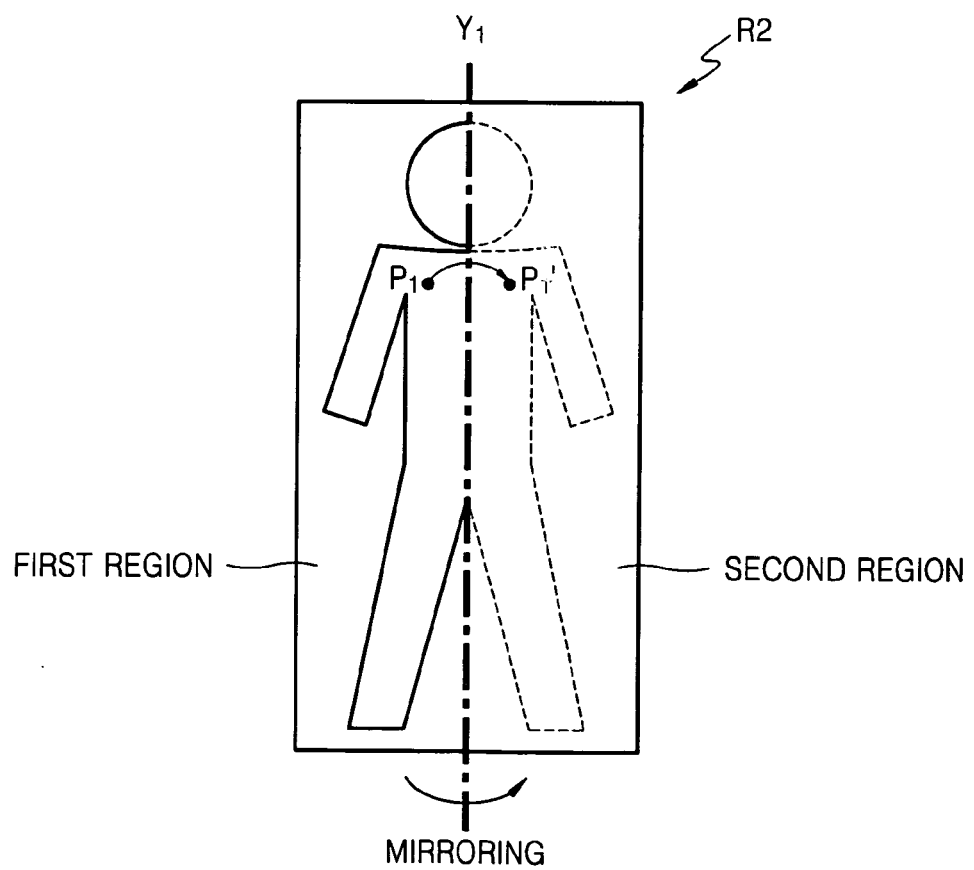
FIGS. 7 and 8 are views for explaining a process of intra-predicting divided regions R2 and R3 illustrated in FIG. 5 with an intraprediction method according to an exemplary embodiment of the present invention.
Figure 8:
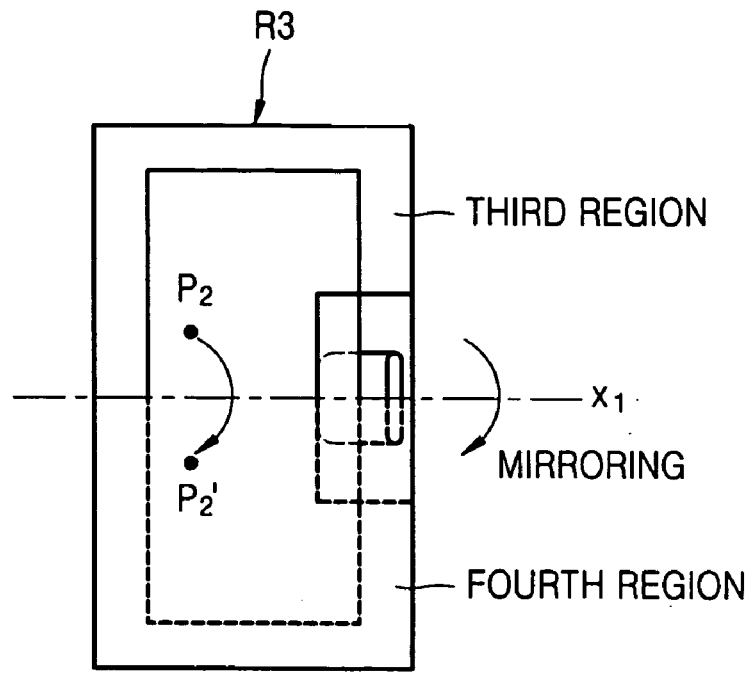

FIGS. 7 and 8 are views for explaining a process of intrapredicting divided regions R2 and R3 shown in FIG. 5 with an intraprediction method according to an exemplary embodiment of the present invention.

Referring to FIG. 7, the divided region R2 includes an object in the form of a person, which is symmetric with respect to a symmetry axis $y_1$. A first region on the left side of the symmetry axis $y_1$ is encoded first. The encoded first region is decoded to reconstruct the first region and a second region is predicted using the axial symmetry of the reconstructed first region with respect to the symmetry axis $y_1$. For example, a pixel $P_1$ of the first region is used for the intraprediction of a pixel $P_1'$ of the second region that is symmetric to the pixel $P_1$ with respect to the symmetry axis $y_1$. Similarly, referring to FIG. 8, in the divided region R3 including an object that is vertically symmetric with respect to a symmetry axis $x_1$, pixel values of a fourth region are predicted using the axial symmetry of a third region encoded prior to the fourth region with respect to the symmetry axis $x_1$.

Although the mirroring is performed on, but not limited thereto, the vertically symmetric object and the horizontally symmetric object in FIGS. 7 and 8 respectively, the present invention can also be applied to intraprediction for encoding of an object that is symmetric with respect to a symmetry axis inclined by a predetermined angle.

After a video of the second region is predicted from the previously encoded first region using the above-described process, a residual between the predicted video of the second region and a region of the original video corresponding to the second region is calculated and then encoded in operation 113.

A region determined to be a symmetric region may be different from an actual symmetric region. This is because a divided region is determined to be a symmetric region if a difference between portions divided from the divided region is less than a predetermined threshold, even if the divided region is not completely symmetric. In this case, a difference between the original video and a predicted video can be reduced through intraprediction using mirroring, and additional motion estimation and compensation.

In the intraprediction method according to the current exemplary embodiment of the present invention, when a video includes a symmetric object, a portion of a symmetric region of the symmetric object is predicted using the other portion of the symmetric region. Thus, a difference between an intrapredicted video and the original video can be reduced when compared to conventional intraprediction methods using pixels of adjacent blocks, thereby improving compression efficiency.

The mirroring used in the intraprediction according to the present invention can be extended to intraprediction of a macroblock according to a general encoding method.

Figure 9:
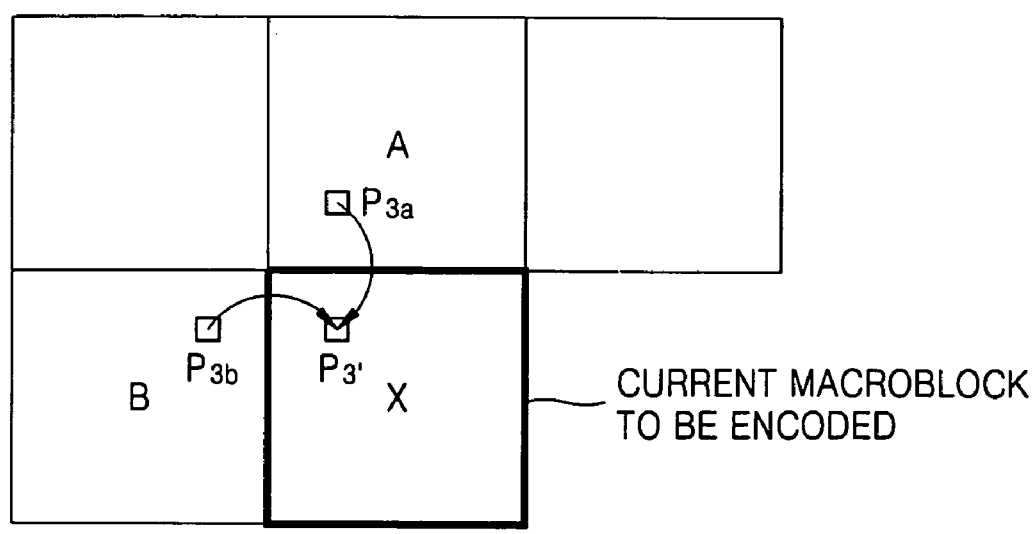
FIG. 9 is a view for explaining how an intraprediction method according to an exemplary embodiment of the present invention is applied to a macroblock.

FIG. 9 is a view for explaining how an intraprediction method according to an exemplary embodiment of the present invention is applied to a macroblock.

Figure 3:
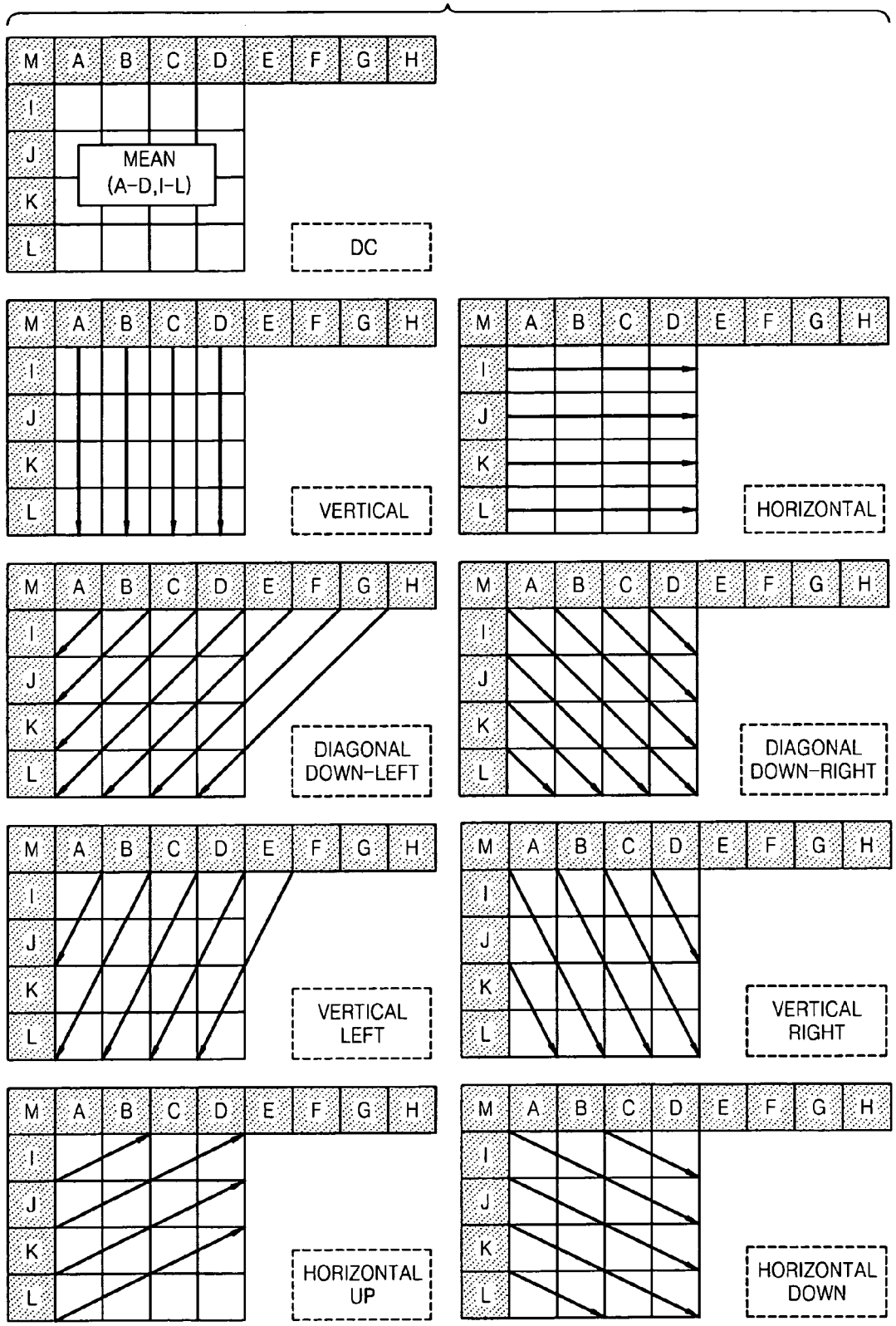
FIG. 3 illustrates intra 4×4 modes used in H.264 according to prior art.

Referring to FIG. 9, when a macroblock is intrapredicted according to the current exemplary embodiment of the present invention, pixel values of a current macroblock X to be encoded are predicted by mirroring pixel values of a macroblock A located above the current macroblock X or a macroblock B located on the left side of the current macroblock X, i.e., using the axial symmetry of the pixel values of the macroblock A or B with respect to a boundary between the current macroblock X and the macroblock A or B. For example, a pixel $P_3'$ of the current macroblock X can be predicted using the axial symmetry of a pixel $P_{3a}$ of the macroblock A or a pixel $P_{3b}$ of the macroblock B with respect to the boundary between the current macroblock X and the macroblock A or B. Next, cost function values of a macroblock predicted in a conventional intra 4×4 mode illustrated in FIG. 3 and a macroblock predicted through the mirroring are compared and a macroblock having the smaller cost function value is determined to be a prediction block of the current macroblock X. The cost function value may be a bit rate. In this case, a macroblock having the smaller bit rate is determined to be a prediction block of the current macroblock X and a difference between the current macroblock X and the prediction block is encoded.

An intraprediction apparatus according to the present invention predicts a region to be encoded in a video using the axial symmetry of another region of the video. Here, the region to be encoded may be a symmetric region or a macroblock that is a unit of general encoding.

Figure 10:
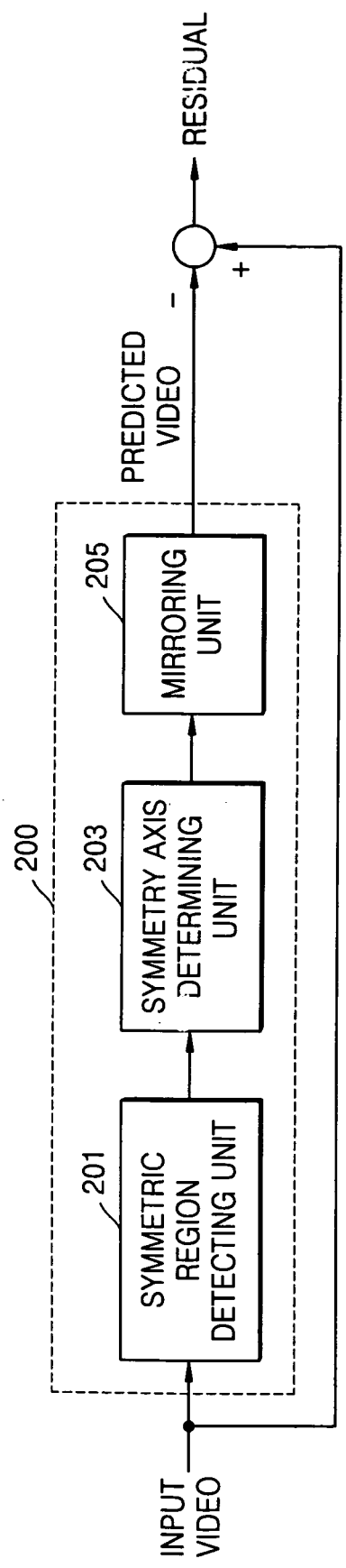
FIG. 10 is a block diagram of an intraprediction apparatus using the symmetry of a video according to the present invention.

FIG. 10 is a block diagram of an intraprediction apparatus using the symmetry of a video according to an exemplary embodiment of the present invention.

Referring to FIG. 10, an intraprediction apparatus 200 includes a symmetric region detecting unit 201, a symmetry axis determining unit 203, and a mirroring unit 205.

The symmetric region detecting unit 201 divides an input video into regions and detects a symmetric region from the divided regions. The symmetric region detecting unit 201 may discriminate an object included in the input video using contour detection or motion vector tracking and divide the input video into a plurality of regions based on the contour of the object. The symmetric region detecting unit 201 divides each of the divided regions into portions using a line and determines whether each of the divided regions is symmetric based on a difference between the divided portions.

The symmetry axis determining unit 203 determines the symmetry axis of the symmetric region detected by the symmetric region detecting unit 201. Here, the symmetry axis may be a straight line that is used by the symmetric region detecting unit 201 and minimizes a difference between the divided portions.

The mirroring unit 205 divides the symmetric region into a first region and a second region using the symmetry axis determined by the symmetry axis determining unit 203 and predicts pixel values of the second region based on the axial symmetry of the first region with respect to the determined symmetry axis. When the intraprediction apparatus 200 is used in a video encoder, a residual between a video predicted by the mirroring unit 205 and the original input video is compressed through discrete cosine transform (DCT)-based transformation, quantization, and entropy encoding.

When the intraprediction apparatus 200 is used in a video decoder, the mirroring unit 205 predicts a prediction video that is the same as that generated by the video encoder from an input video as a bitstream and adds a residual included in the bitstream to the prediction video, thereby reconstructing the original video.

In other words, to generate the same prediction video in the video encoder and the video decoder, the video encoder adds symmetric region information about the detected symmetric region to a header of the bitstream and performs compression encoding. The video decoder detects a symmetric region of a video to be decoded from the symmetric region information and generates a prediction video that is the same as that generated by the video encoder by performing intraprediction on the detected symmetric region.

The intraprediction apparatus 200 according to the present invention may predict pixel values of a current macroblock to be encoded by mirroring pixel values of a macroblock located above the current macroblock or a macroblock located on the left side of the current macroblock, i.e., based on the axial symmetry of the pixel values of the macroblock located above or on the left side of the current block with respect to a boundary between the current macroblock and the macroblock located above or on the left side of the current block.

Figure 11:
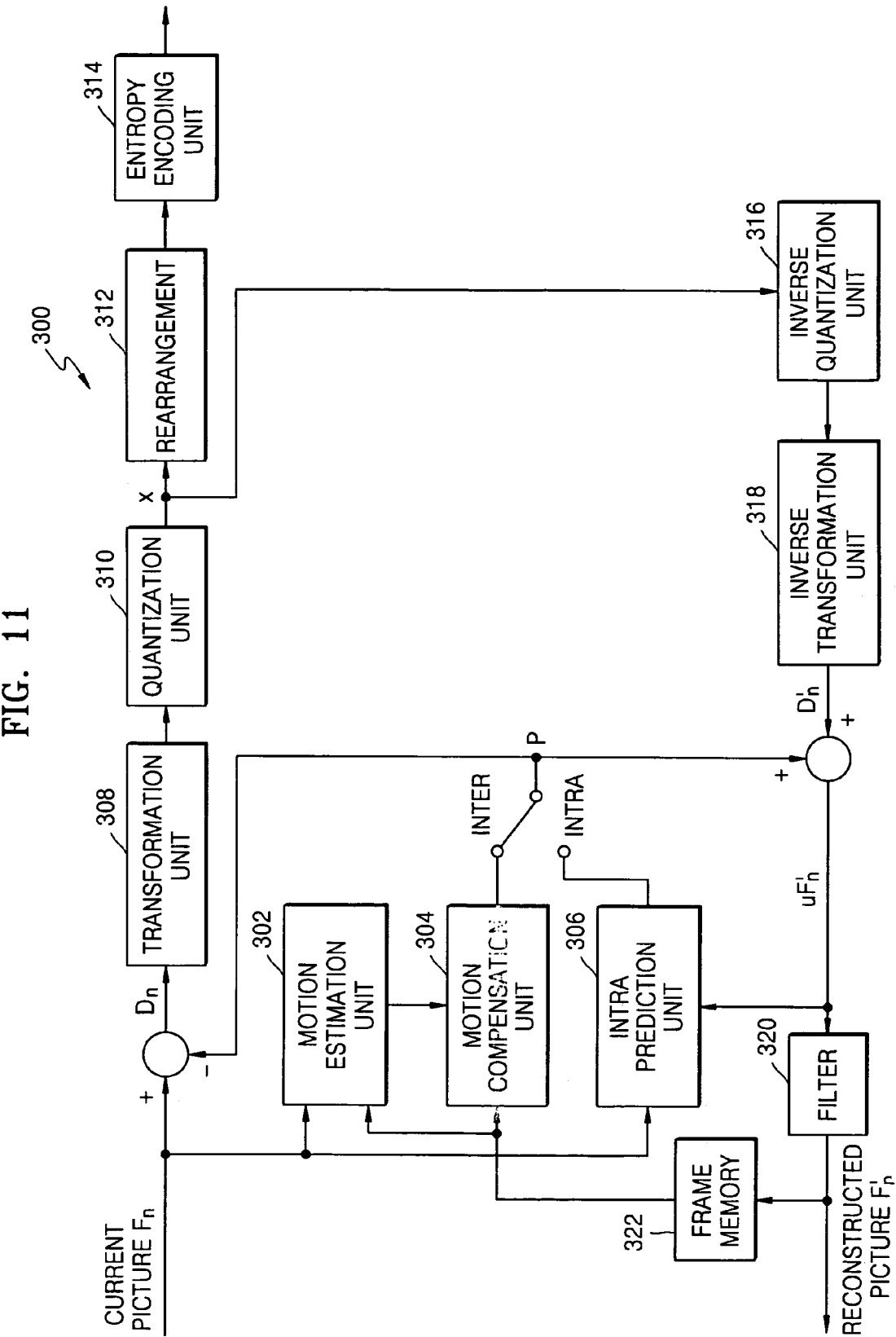
FIG. 11 is a block diagram of a video encoder according to an exemplary embodiment of the present invention.

FIG. 11 is a block diagram of a video encoder according to an exemplary embodiment of the present invention.

Referring to FIG. 11, a video encoder 300 includes a motion estimation unit 302, a motion compensation unit 304, an intraprediction unit 306, a transformation unit 308, a quantization unit 310, a rearrangement unit 312, an entropy encoding unit 314, an inverse quantization unit 316, an inverse transformation unit 318, a filter 320, and a frame memory 322. In the current exemplary embodiment of the present invention, the intraprediction apparatus 200 of FIG. 10 is used as the intraprediction unit 306. The transformation unit 308, the quantization unit 310, the rearrangement unit 312, and the entropy encoding unit 314 constitute a compression unit that compression-codes a video to be encoded and outputs a bitstream.

The video encoder 300 encodes a macroblock of a current picture in an encoding mode selected from among a plurality of encoding modes. To this end, cost function values are calculated by performing encoding in all encoding modes available in interprediction and intraprediction, a mode having the smallest cost function value is selected as the optimal encoding mode, and encoding is performed in the selected optimal encoding mode. Here, the cost function indicates the accuracy of predictive encoding and the amount of generated bits. Cost functions include a sum of absolute difference (SAD) cost function, a sum of absolute transformed difference (SATD) cost function, a sum of square difference (SSD) cost function, a mean of absolute difference (MAD) cost function, and a Lagrange cost function. For interprediction, the motion estimation unit 302 searches in a reference picture for a prediction value of a macroblock of a current picture. If the motion estimation unit 302 searches for a reference block in units of a ½ pixel or a ¼ pixel, the motion compensation unit 304 calculates an intermediate pixel and determines data of the reference block. As such, interprediction is performed by the motion estimation unit 302 and the motion compensation unit 304.

The intraprediction unit 306 performs intraprediction where a prediction value of a macroblock of a current picture is searched for in the current picture. As in the intraprediction apparatus 200 illustrated in FIG. 10, after detecting a symmetric region from a current picture, the intraprediction unit 306 generates prediction data of the current picture by intrapredicting a portion of the symmetric region based on the axial symmetry of the other portion of the symmetric region with respect to a symmetry axis.

If prediction data to be used to by a macroblock of a current picture is obtained through interprediction or intraprediction, it is subtracted from the macroblock of the current picture. The remainder of the macroblock is transformed by the transformation unit 308 and is quantized by the quantization unit 310. The remainder of the macroblock after the subtraction of the prediction data is also encoded to reduce the amount of data in encoding. The quantized residual passes through the rearrangement unit 312 to be encoded by the entropy encoding unit 314. The entropy encoding unit 314 performs compression encoding on residual information about the residual and symmetric region information about the detected symmetric region and outputs a bitstream.

To obtain a reference picture to be used for interprediction, a quantized picture passes through the inverse quantization unit 316 and the inverse transformation unit 318 to reconstruct a current picture. The reconstructed current picture is stored in the frame memory 322 and is used later for interprediction of a next picture. Once the reconstructed current picture passes through the filter 320, the original picture having additional encoding errors is obtained.

Figure 12:
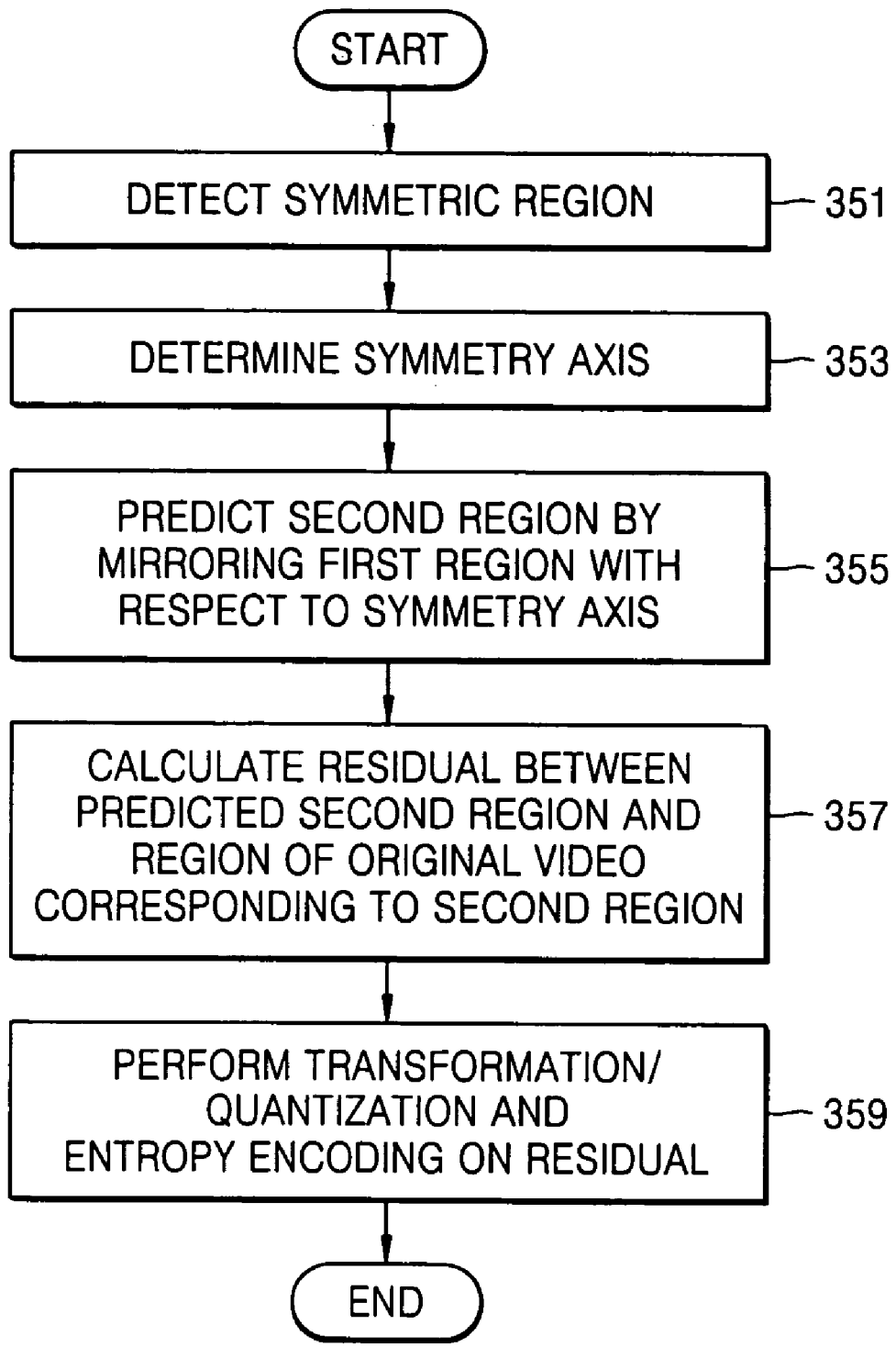
FIG. 12 is a flowchart illustrating a video encoding method according to an exemplary embodiment of the present invention.

FIG. 12 is a flowchart illustrating a video encoding method according to an exemplary embodiment of the present invention.

Referring to FIG. 12, a symmetric region is detected from a video to be encoded in an intraprediction mode in operation 351. As mentioned above, whether to perform interprediction or intraprediction on a current macroblock is determined by comparing cost function values in all the possible encoding modes. A video encoded in an interprediction mode is predicted from a previous or future reference video.

If a symmetric region is detected from a video to be encoded in an intraprediction mode, the symmetry axis of the detected symmetric region is determined in operation 353.

Next, the detected symmetric region is divided into a first region and a second region using the determined symmetry axis and a video of the second region is predicted by mirroring a video of the first region encoded prior to the second region, i.e., based on the axial symmetry of the video of the first region with respect to the determined symmetry axis, in operation 355.

A residual is calculated by subtracting the predicted video of the second region from a region of the original video corresponding to the second region, in operation 357.

The residual is compression-encoded using transformation, quantization, and entropy encoding, in operation 359. Here, a bitstream output after compression encoding includes the symmetric region information as additional information.

Figure 13:
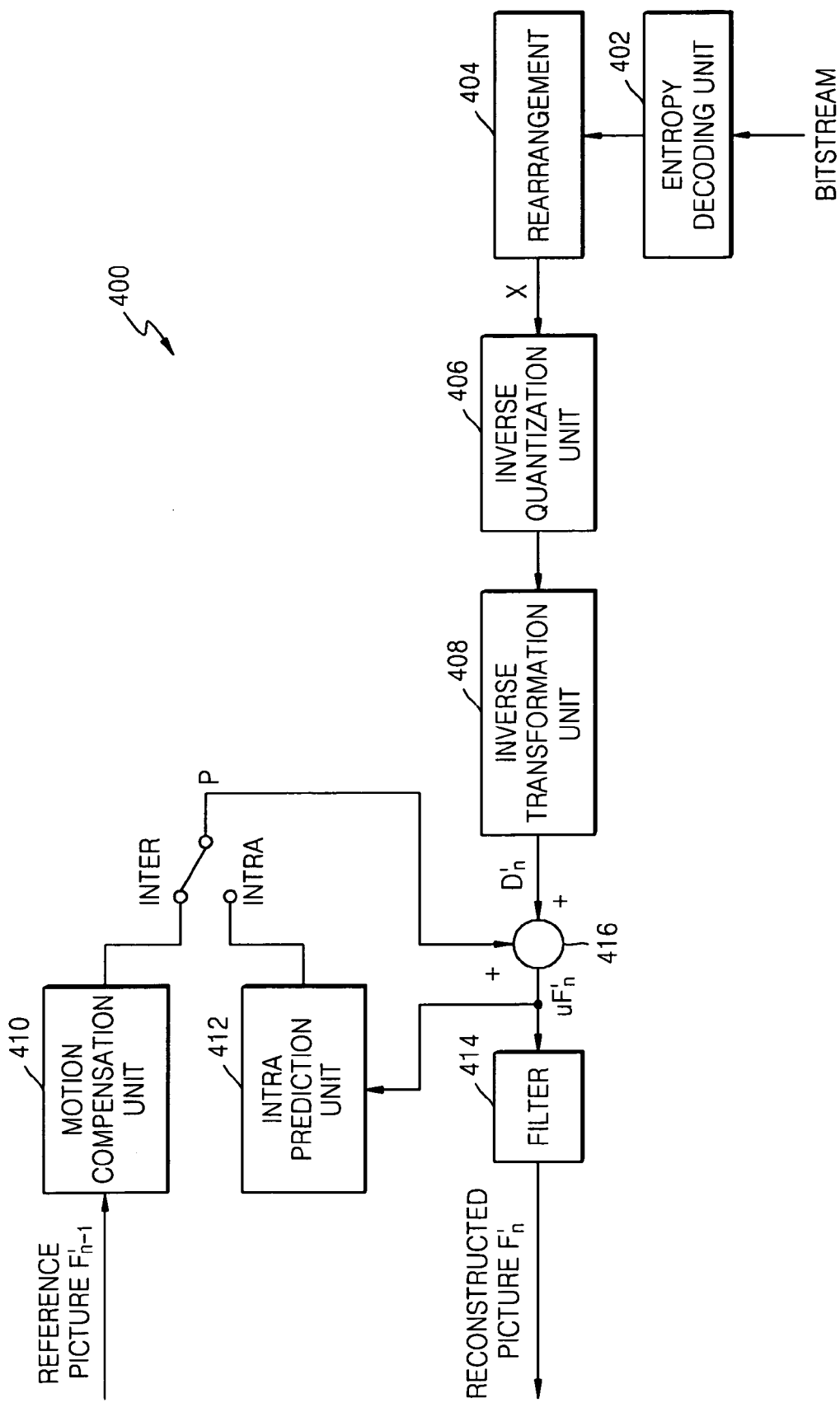
FIG. 13 is a block diagram of a video decoder according to an exemplary embodiment of the present invention.

FIG. 13 is a block diagram of a video decoder according to an exemplary embodiment of the present invention.

Referring to FIG. 13, a video decoder 400 includes an entropy decoding unit 402, a rearrangement unit 404, an inverse quantization unit 406, an inverse transformation unit 408, a motion compensation unit 410, an intraprediction unit 412, a filter 414, and an adder 416. Here, the intraprediction apparatus 200 according to the present invention is used as the intraprediction unit 412.

The entropy decoding unit 402 and the rearrangement unit 404 receive and entropy-decode a compressed bitstream to generate a quantized coefficient X. The inverse quantization unit 406 and the inverse transformation unit 408 perform inverse quantization and inverse transformation on the quantized coefficient X to extract transformation encoding coefficients, i.e., motion vector information and header information. The motion compensation unit 410 and the intraprediction unit 412 generate a prediction block using decoded header information according to an encoded picture type. The adder 416 adds an error value $D'_n$ to the prediction block to generate $uF'_n$. $uF'_n$ passes through the filter 414, thereby generating a reconstructed picture $F'_n$.

Like the video encoder 300, after determining whether a symmetric region is included in a current picture to be decoded, the intraprediction unit 412 used in the video decoder 400 generates a reference block by intrapredicting a portion of the symmetric region based on the axial symmetry of the other portion of the symmetric region decoded previously with respect to a symmetry axis and reconstructs the original video by adding the residual to the reference block. Here, the intraprediction unit 412 may determine which portion of a video to be decoded corresponds to a symmetric region based on the symmetric region information included in the bitstream.

Figure 14:
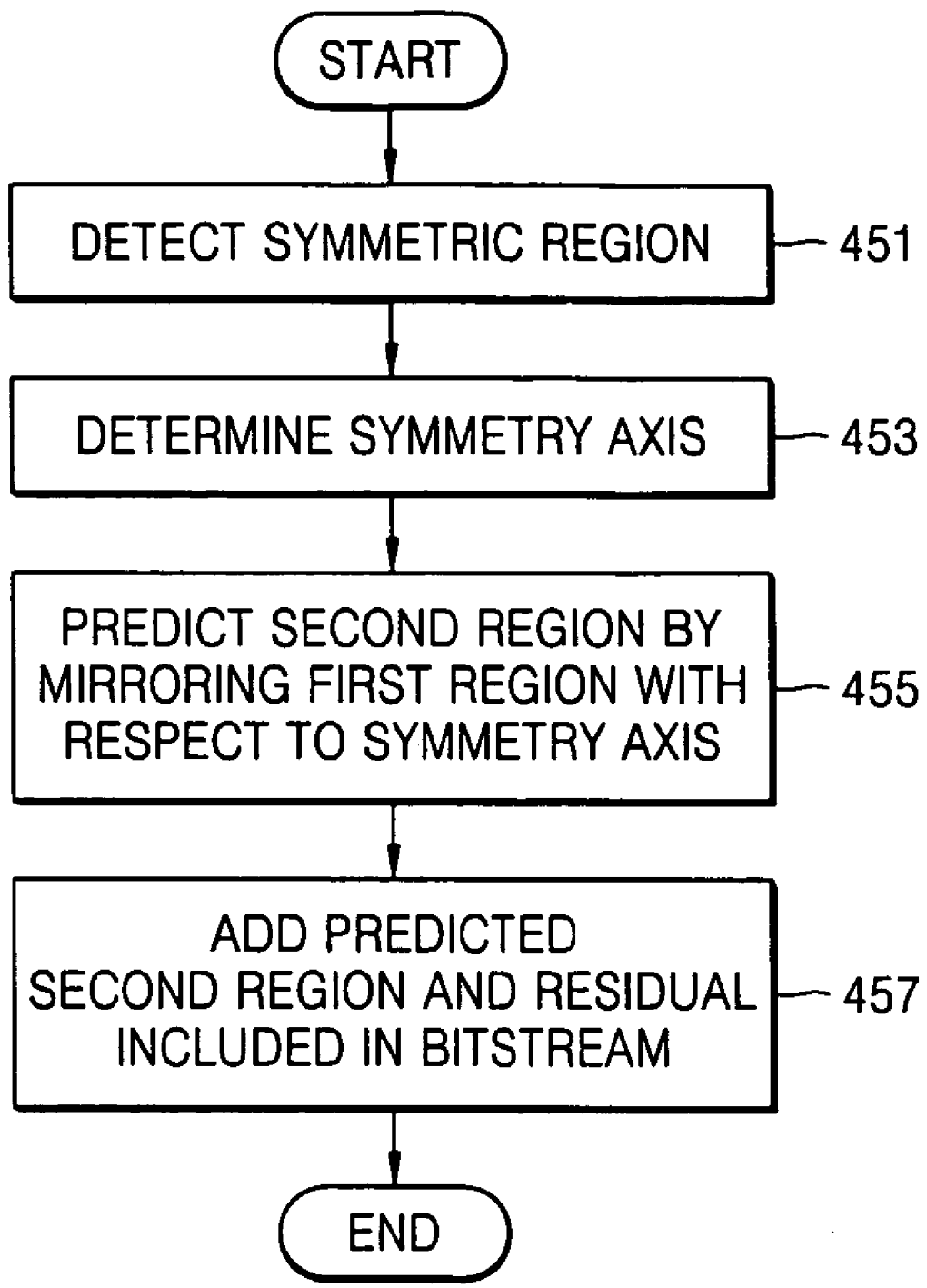
FIG. 14 is a flowchart illustrating a video decoding method according to an exemplary embodiment of the present invention.

FIG. 14 is a flowchart illustrating a video decoding method according to an exemplary embodiment of the present invention.

Referring to FIG. 14, a symmetric region is detected from a video to be decoded in operation 451. As mentioned above, once symmetric region information is included in a header of a bitstream as additional information, the symmetric region used for intraprediction is determined.

If a symmetric region is detected, the symmetry axis of the detected symmetric region is determined in operation 453. Next, in operation 455, the detected symmetric region is divided into a first region and a second region using the determined symmetry axis and a video of the second region is predicted by mirroring a video of the first region decoded prior to the first region, i.e., based on the axial symmetry of the video of the first region with respect to the determined symmetry axis.

In operation 457, the predicted video of the second region and a residual included in the bitstream are added, thereby reconstructing the original video.

As described above, according to the present invention, if a symmetric region exists in a video, a portion of the symmetric region is predicted by mirroring the other portion of the symmetric region with respect to the symmetry axis of the symmetric region to generate a reference video. Only a residual between the original video and the reference video is encoded, thereby improving video compression efficiency.

Meanwhile, the present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves. The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An intraprediction method comprising:
performing intraprediction by predicting information in a second region of a frame to be encoded in a video based on an axial symmetry between the second region and a first region of the frame with respect to a predetermined axis.

2. The intraprediction method of claim 1, wherein:
the predetermined axis is a symmetry axis; and
the performing intraprediction comprises:
detecting a symmetric region of the frame;
determining the symmetry axis of the symmetric region; and
dividing the symmetric region into the first region and the second region and predicting the information in the second region based on the first region.

3. The intraprediction method of claim 2, wherein the symmetry axis divides the symmetric region into the first region and the second region and minimizes a difference between the first region and the second region.

4. The intraprediction method of claim 2, wherein the information in the second region is predicted based on the axial symmetry of the first region with respect to the symmetry axis.

5. The intraprediction method of claim 2, wherein the symmetric region of the video is detected using contour detection.

6. The intraprediction method of claim 2, wherein the symmetric region of the video is detected using motion vector tracking.

7. The intraprediction method of claim 2, further comprising performing motion estimation and compensation on the information in the second region.

8. The intraprediction method of claim 1, wherein the second region to be encoded comprises a macroblock which is predicted based on an axial symmetry of an adjacent macroblock of the first region with respect to a boundary between the macroblock and the adjacent macroblock.

9. An intraprediction apparatus comprising:
a processor which performs intraprediction by predicting information in a second region of a frame to be encoded in a video based on an axial symmetry between the second region and a first region of the frame with respect to a symmetry axis.

10. The intraprediction apparatus of claim 9, wherein the processor comprises:
- a symmetric region detecting unit which detects a symmetric region of the frame;
- a symmetry axis determining unit which determines the symmetry axis of the symmetric region; and
- a mirroring unit which divides the symmetric region into the first region and the second region and predicts the information in the second region based on the first region.

11. The intraprediction apparatus of claim 10, wherein the symmetry axis divides the symmetric region into the first region and the second region and minimizes a difference between the first region and the second region.

12. The intraprediction apparatus of claim 10, wherein the mirroring unit predicts the information in the second region based on the axial symmetry of the first region with respect to the symmetry axis.

13. The intraprediction apparatus of claim 10, wherein the symmetric region detecting unit comprises a contour detector that detects a contour of the video and determines whether the contour is symmetric.

14. The intraprediction apparatus of claim 10, wherein the symmetric region detecting unit comprises a motion vector tracking unit that tracks motion vectors of blocks of the video, detects a contour of an image of the video, and determines whether the contour is symmetric.

15. The intraprediction apparatus of claim 9, wherein the second region to be encoded comprises a macroblock and the macroblock is predicted through the axial symmetry of an adjacent macroblock of the first region with respect to a boundary between the macroblock and the adjacent macroblock.

16. A video encoding method comprising:
- detecting a symmetric region of a frame of a video to be encoded in an intraprediction mode;
- determining a symmetry axis of the symmetric region and predicting a first portion of the symmetric region based on a second portion of the symmetric region with respect to the symmetry axis; and
- calculating a difference between the first portion and the second portion and performing compression encoding on information about the difference and information about the symmetric region.

17. The video encoding method of claim 16, wherein the symmetry axis divides the symmetric region into the first portion and the second portion and minimizes a difference between the first portion and the second portion.

18. The video encoding method of claim 16, wherein the first portion of the symmetric region is predicted based on an axial symmetry of a previously encoded symmetric region.

19. A video encoder comprising:
- an intraprediction unit which detects a symmetric region of a video and predicts a first portion of the symmetric region based on a second portion of the symmetric region with respect to a symmetry axis; and
- a compression unit which performs compression encoding on information about a difference between a video predicted by the intraprediction unit and an original video and information about the symmetric region.

20. The video encoder of claim 19, wherein the intraprediction unit divides the symmetric region into the first portion and a second portion using a line and determines a line that minimizes a difference between the first portion and the second portion as the symmetry axis.

21. The video encoder of claim 19, wherein the intraprediction unit predicts pixel values of the first portion of the symmetric region based on an axial symmetry of the second portion.

22. A video decoding method of decoding a video from a compression-encoded bitstream, the video decoding method comprising:
- detecting a symmetric region of a frame of a video included in the compression-encoded bitstream; and
- decoding a first portion of the symmetric region to generate a decoded first portion and then a second portion of the symmetric region with respect to a symmetry axis of the symmetric region and predicting information in the second portion using the decoded first portion.

23. The video decoding method of claim 22, wherein the symmetry axis divides the symmetric region into the first portion and the second portion and minimizes a difference between the first portion and the second portion.

24. The video decoding method of claim 22, wherein pixel values of the second portion are predicted based on an axial symmetry of the first portion with respect to the symmetry axis.

25. The video decoding method of claim 22, wherein the symmetric region is detected from symmetric region information included in the compression-encoded bitstream.

26. The video decoding method of claim 22, further comprising reconstructing original video by adding the information in the second portion and a residual included in the compression-encoded bitstream.

27. A video decoder that decodes a video from a compression-encoded bitstream, the video decoder comprising:
- an intraprediction unit which detects a symmetric region of a frame of a video included in the compression-encoded bitstream, decodes a first portion of the symmetric region to generate a decoded first portion and then a second portion of the symmetric region with respect to a symmetry axis of the symmetric region, and predicts information in the second portion based on the decoded first portion.

28. The video decoder of claim 27, wherein the intraprediction unit determines a line that divides the detected symmetric region into portions by passing through the detected symmetric region and minimizes a difference between the first portion and the second portion as the symmetry axis.

29. The video decoder of claim 27, wherein the intraprediction unit predicts pixel values of the second portion based on an axial symmetry of the first portion with respect to the symmetry axis.

30. The video decoder of claim 27, wherein the intraprediction unit detects the symmetric region from symmetric region information included in the compression-encoded bitstream.

31. The video decoder of claim 27, further comprising an adder which reconstructs original video by adding a video predicted by the intraprediction unit and a residual included in the compression-encoded bitstream.

* * * * *